(12) United States Patent
Chen et al.

(10) Patent No.: US 9,122,454 B2
(45) Date of Patent: Sep. 1, 2015

(54) HINGE MODULE AND ELECTRONIC DEVICE

(71) Applicant: Acer Incorporated, New Taipei (TW)

(72) Inventors: Hsien-Wei Chen, New Taipei (TW); Cheng-Nan Ling, New Taipei (TW); Yi-Ta Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 13/938,224

(22) Filed: Jul. 9, 2013

(65) Prior Publication Data

US 2014/0317882 A1 Oct. 30, 2014

(30) Foreign Application Priority Data

Apr. 24, 2013 (TW) .............................. 102114643 A

(51) Int. Cl.
*E05F 1/08* (2006.01)
*G06F 1/16* (2006.01)

(52) U.S. Cl.
CPC .............. *G06F 1/1681* (2013.01); *Y10T 16/525* (2015.01)

(58) Field of Classification Search
CPC ............. E05F 3/16; E05F 5/10; E05F 1/1058; E05Y 2201/264; E05Y 2201/21; H05K 5/0073
USPC ............. 16/286, 50, 54, 49, 51, 66, 291, 293; 361/679.27; 248/918–920, 923, 447, 248/133; 188/266, 281; 267/70, 71, 195, 267/196, 216
See application file for complete search history.

(56) References Cited

U.S. PATENT DOCUMENTS

| 4,433,759 | A | * | 2/1984 | Ichinose | 188/282.8 |
| 5,517,719 | A | * | 5/1996 | Christ | 16/49 |
| 6,028,768 | A | * | 2/2000 | Cipolla | 361/679.12 |
| 6,826,043 | B2 | | 11/2004 | Chang | |
| 7,610,656 | B2 | * | 11/2009 | Vanini | 16/286 |
| 7,762,515 | B2 | * | 7/2010 | Lin | 248/447 |
| 8,615,846 | B2 | * | 12/2013 | Wheeler et al. | 16/82 |
| 2002/0088677 | A1 | * | 7/2002 | Fitz et al. | 188/304 |
| 2003/0141638 | A1 | * | 7/2003 | Salice | 267/34 |
| 2009/0268400 | A1 | * | 10/2009 | Chen | 361/679.55 |

FOREIGN PATENT DOCUMENTS

| TW | 575719 | 2/2004 |
| TW | I330311 | 9/2010 |
| TW | M447071 | 2/2013 |

* cited by examiner

*Primary Examiner* — Victor Batson
*Assistant Examiner* — Matthew Sullivan
(74) *Attorney, Agent, or Firm* — Jianq Chyun IP Office

(57) ABSTRACT

A hinge module connected between a first body and a second body of an electronic device is provided. The hinge module includes a hinge connecting the first and the second bodies, a linking rod, and a sleeve pivoted to the second body. The linking rod has a first end connected to the first body and a second end slidably coupled into the sleeve. When the first and the second bodies are rotated by the hinge module, the first body drives the linking rod such that the second end slides in the sleeve and drives the sleeve to rotate relative to the second body. Inner wall of the sleeve has at least one interfering section. When the second end moves onto the interfering section, the linking rod is interfered to the sleeve, such that the first body is supported by the hinge module and opened relative to the second body.

12 Claims, 7 Drawing Sheets

HINGE MODULE AND ELECTRONIC DEVICE

CROSS-REFERENCE TO RELATED APPLICATION

This application claims the priority benefit of Taiwan application serial no. 102114643, filed on Apr. 24, 2013. The entirety of the above-mentioned patent application is hereby incorporated by reference herein and made a part of this specification.

FIELD OF THE INVENTION

The present invention relates to a hinge module, and more particularly to a hinge module of an electronic device.

DESCRIPTION OF RELATED ART

Industries of portable computer devices such as hand-held personal computers, portable computers, notebook computers, tablet computers and personal digital assistants (PDA), become more and more popular. Generally speaking, a basic host unit and a display assembly for displaying are used in a portable computer device, so as to meet the requirements of users for operating and watching. Especially, with rapid development of touch display technology, touch screens have gradually become basic equipments for the portable computers.

Taking a notebook computer as an example, a hinge disposed between two bodies is used as a mechanism for motions between the two bodies. However, once a touch screen is applied therein, when the two bodies are unfolded, the hinge is still required to be able to support the force exerted on the touch screen by the user. In the meanwhile, the cables connected between the two bodies have to pass through via the hinge structure. Therefore, how to design a hinge structure which has both supporting force and structural strength so as to meet the operating requirements of users is an important issue the related manufacturers in this field must face.

SUMMARY OF THE INVENTION

The disclosure provides a hinge module and an electronic device, wherein the torque of the hinge module can be adjusted corresponding to the rotating angle of the body of the electronic device.

The hinge module of the disclosure is used for being connected between the first body and the second body of the electronic device. The first body and the second body relatively rotate via the hinge module. The hinge module includes a hinge, a linking rod and a sleeve. The hinge connects the first body and the second body. The linking rod has a first end and a second end. The first end is connected to the first body. The sleeve is pivoted to the second body. The second end of the linking rod is slidably coupled into the sleeve. When the first body and the second body relatively rotate via the hinge module, the first body drives the linking rod, such that the second end of the linking rod slides in the sleeve and drives the sleeve to rotate relative to the second body. The inner wall of the sleeve has at least one interfering section, wherein when the second end of the linking rod moves to the interfering section, the linking rod and the sleeve interferes with each other such that the first body is supported by the hinge module and unfolded relative to the second body.

The electronic device of the disclosure includes a first body, a second body and a hinge module. The hinge module is connected between the first body and the second body, so that the first body rotates relative to the second body. The hinge module includes a hinge, a linking rod and a sleeve. The hinge connects the first body and the second body. The linking rod has a first end and a second end. The first end is connected to the first body. The sleeve is pivoted to the second body. The second end of the linking rod is slidably coupled into the sleeve. When the first body and the second body relatively rotate via the hinge module, the first body drives the linking rod, such that the second end of the linking rod slides in the sleeve and drives the sleeve to rotate relative to the second body. The inner wall of the sleeve has at least one interfering section, wherein when the second end of the linking rod moves to the interfering section, the linking rod and the sleeve interferes with each other such that the first body is supported by the hinge module and unfolded relative to the second body.

In light of the above, in the embodiment of the disclosure, through the linking rod and the sleeve of the hinge module being formed a linkage assembly structure between the first body and the second body, the relative motions between the linking rod and the sleeve can be driven at the time of the first body and the second body relatively rotating via the hinge. At the same time, through the interfering section disposed in the sleeve, when the linking rod moves into the interfering section, a friction force can be generated therebetween. Accordingly, a torque of the hinge module is formed so as to support the first body to be unfolded relative to the second body in a specific angle, simultaneously the friction force is sufficient to support the required supporting force when the user touches the touch screen (namely, the first body). Therefore, through the cooperating of the sliding process between the linking rod and the sleeve and the interfering section, the electronic device has both the structure of the body and the operating supporting force such that the electronic device can be handled corresponding to the open angles.

To make the above features and advantages of the present invention more comprehensible, several embodiments accompanied with drawings are described in detail as follows.

BRIEF DESCRIPTION OF THE DRAWINGS

The accompanying drawings constituting a part of this specification are incorporated herein to provide a further understanding of the disclosure. Here, the drawings illustrate embodiments of the disclosure and, together with the description, serve to explain the principles of the disclosure.

DESCRIPTION OF EMBODIMENTS

Figure 1A:
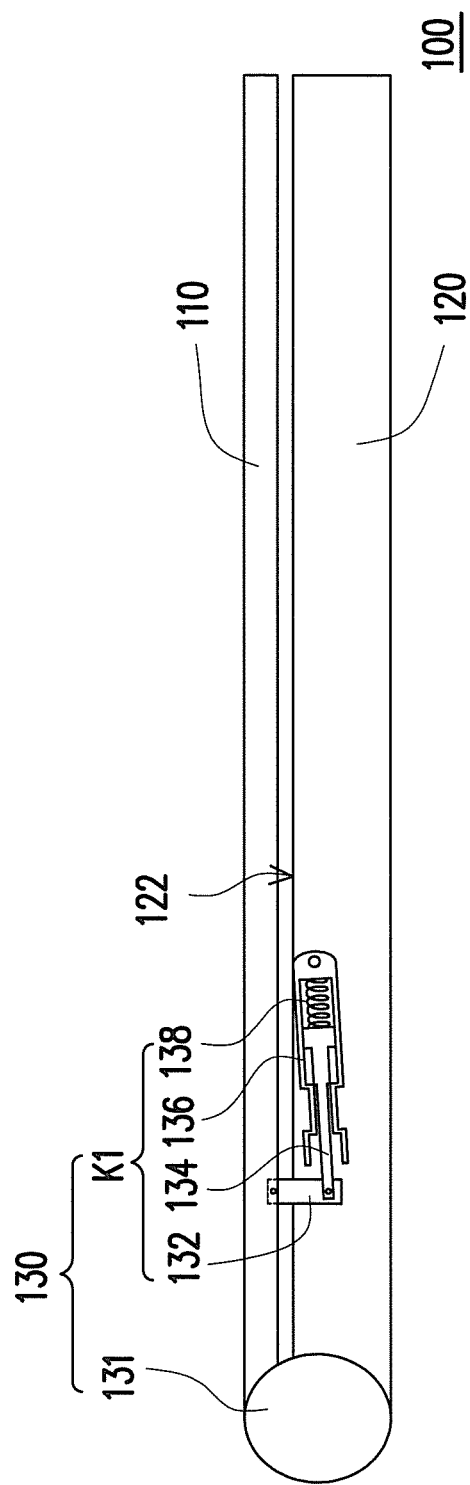
FIG. 1A is a schematic side view of an electronic device according to an exemplary embodiment of the disclosure.
Figure 1B:
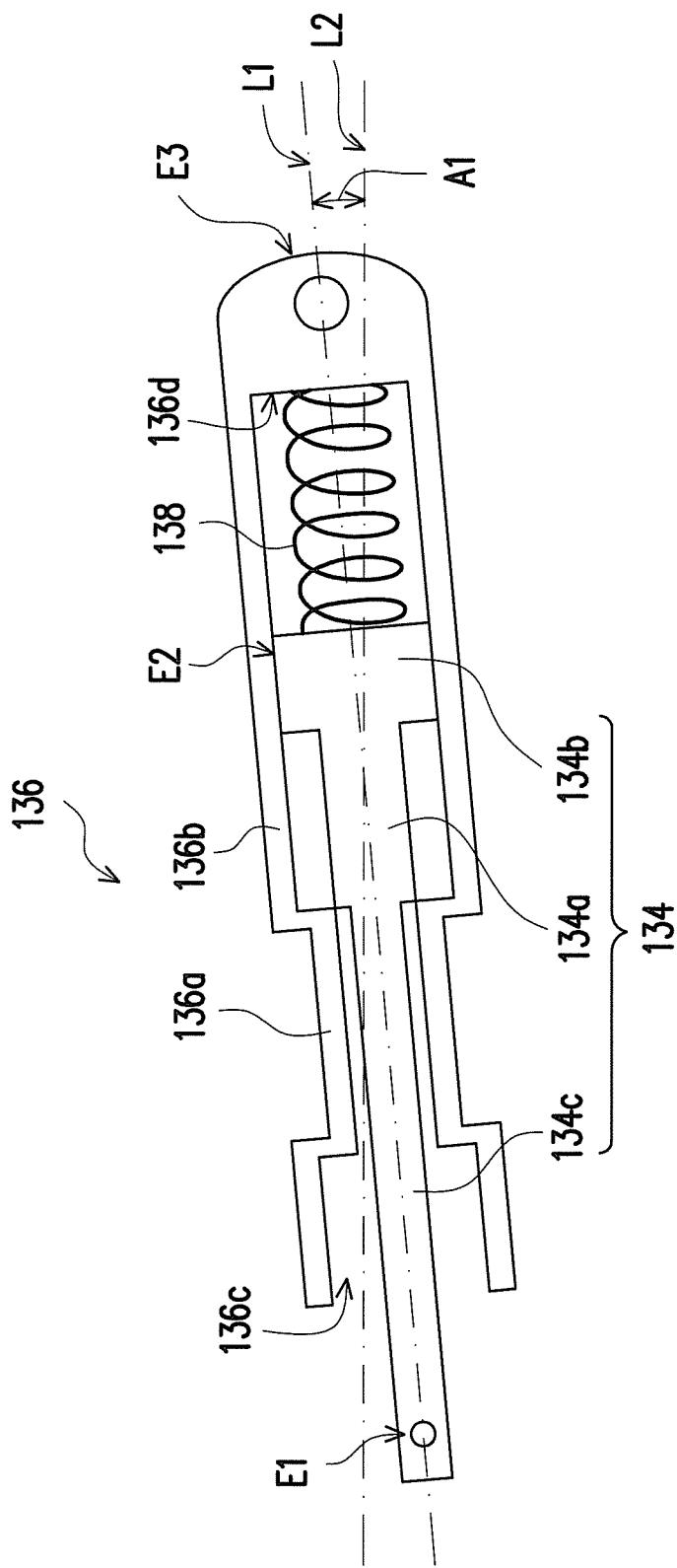
FIG. 1B is an enlarged schematic view of a portion of the components of the electronic device in FIG. 1A.

FIG. 1A is a schematic side view of an electronic device according to an exemplary embodiment of the disclosure. Herein the figure is drawn in a partial perspective view, such that the relationship between portions of the components within the electronic device can be clearly described. FIG. 1B is an enlarged schematic view of a portion of the components of the electronic device in FIG. 1A, for clearly describing the correlations of components during the motions of the bodies. Referring to FIG. 1A and FIG. 1B, in the embodiment, the electronic device 100 is a notebook computer, for example, and includes a first body 110, a second body 120 and a hinge module 130. The first body 110 is the display screen of the notebook computer, and the second body 120 is the host of the notebook computer, for example. Herein, what is special is that, the first body 110 can also be a touch display screen, such that users can use the keyboard disposed on the host or the touch pad (not shown) as an interface for inputting and operating the notebook computer, and can also directly operate the touch display screen to obtain the effect of the control of the notebook computer.

The hinge module 130 is connected between the first body 110 and the second body 120, so that the first body 110 rotates relative to the second body 120 to achieve an effect of folding and unfolding. In the embodiment, the hinge module 130 includes a hinge 131 and a linkage assembly K1, wherein the hinge 131 is connected between the first body 110 and the second body 120, such that the bodies 110, 120 can meet a rotating requirement of relatively rotation. Therefore, the structure of the hinge 131 is not limited herein, and any related structure which can achieve the abovementioned effect in the invention field can be adapted in the embodiment.

Referring to FIG. 1B, the linkage assembly K1 is pivoted to the first body 110 and the second body 120 respectively, and the linkage assembly K1 includes a sleeve 136 and linking rods 132, 134. In the embodiment, the linking rod 134 has a first end E1 and a second end E2 opposite to the first end E1, wherein the first end E1 is pivoted to an end of the linking rod 132, and the other end of the linking rod 132 is pivoted to the first body 110. The bottom E3 of the sleeve 136 is pivoted to the second body 120, and the second end E2 of the linking rod 134 is slidably coupled into the sleeve 136. As such, the change of the rotating status between the first body 110 and the second body 120 can change the motion status between the linking rods 132, 134 and the sleeve 136, and especially the sliding status between the linking rod 134 and the sleeve 136.

Figure 2A:
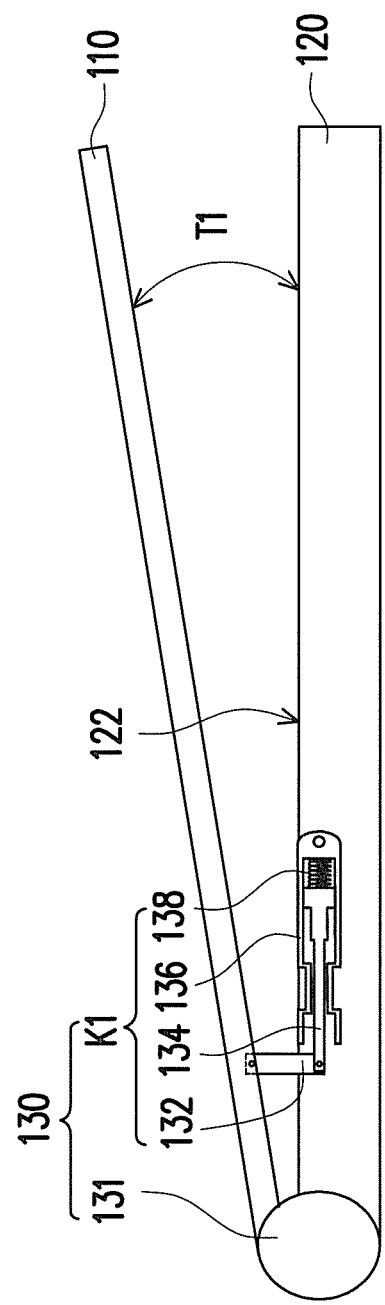
FIGS. 2A and 2B are schematic views showing the electronic device and the related structure thereof being in another status.
Figure 2B:
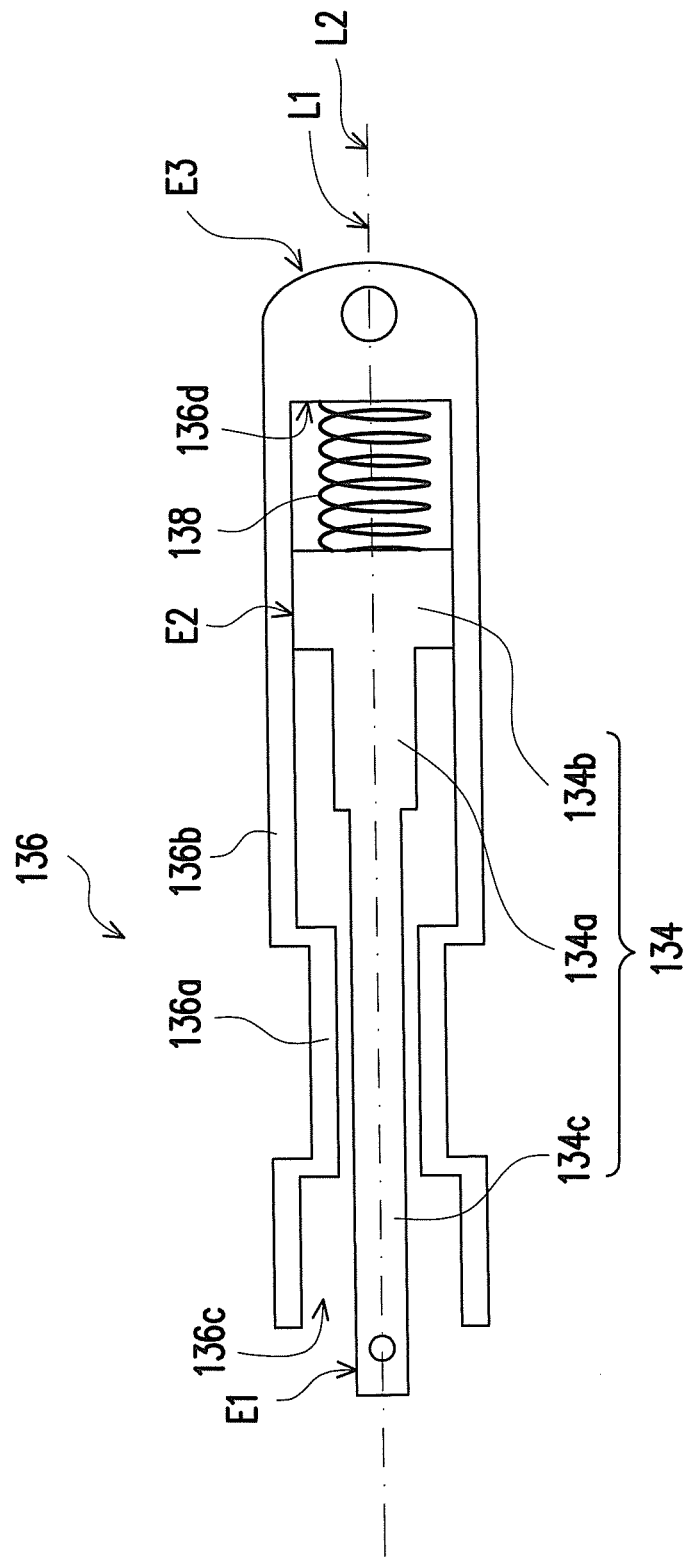
Figure 3A:
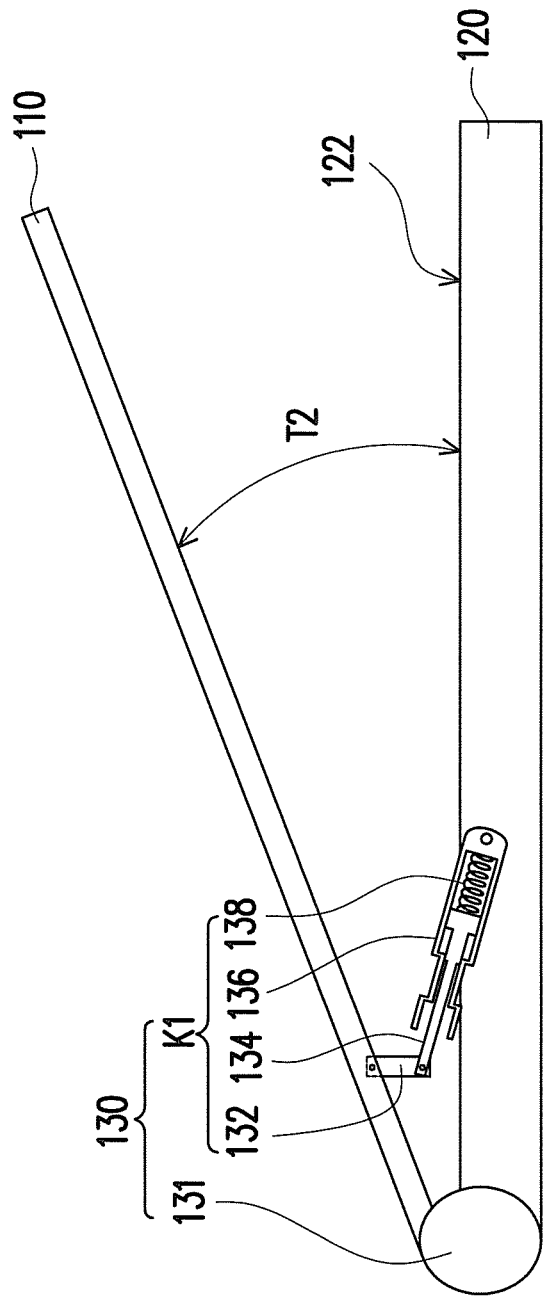
FIGS. 3A and 3B are schematic views showing the electronic device and the related structure thereof further being in another status.
Figure 3B:
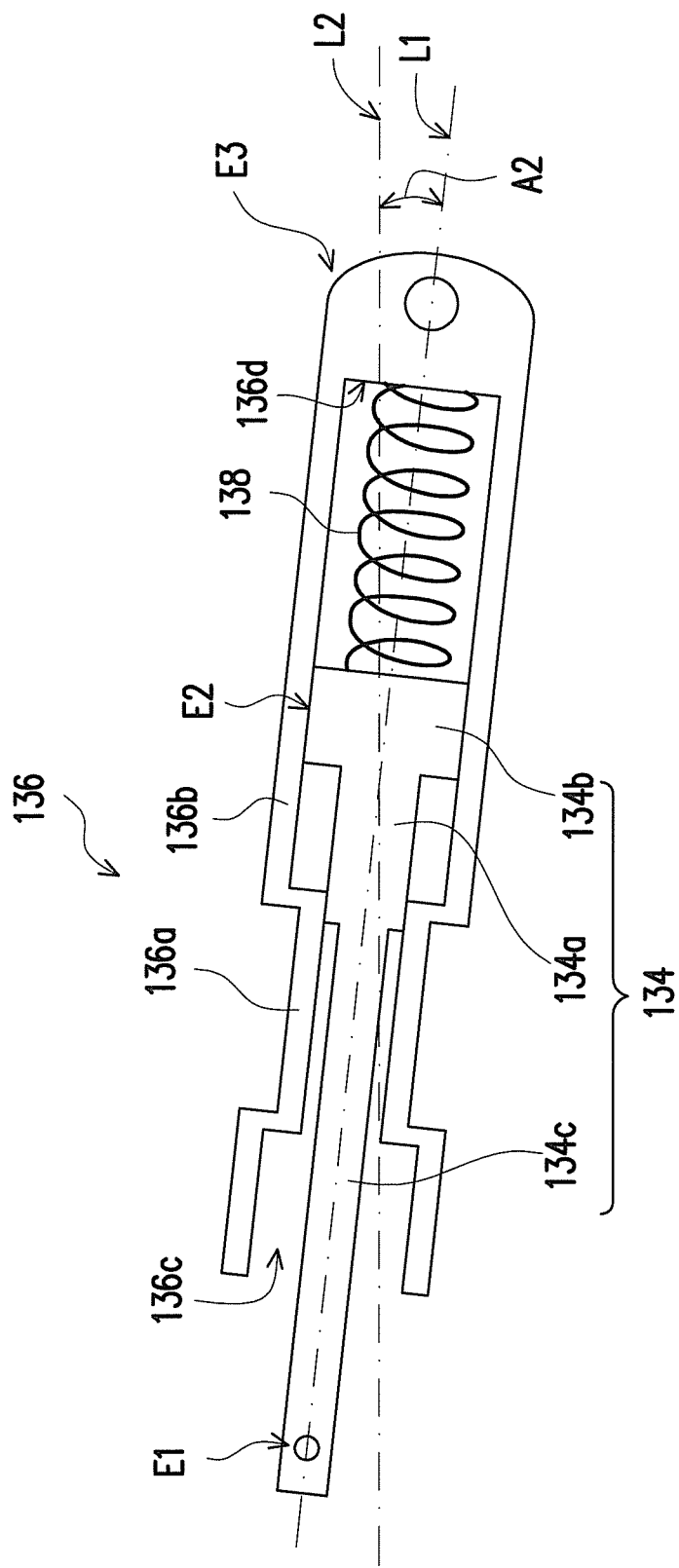

In detailed description, FIGS. 2A and 2B are schematic views showing the electronic device and the related structure thereof being in another status. FIGS. 3A and 3B are schematic views showing the electronic device and the related structure thereof further being in another status. Referring to FIG. 1A, FIG. 2A and FIG. 3A first, when the first body 110 and the second body 120 are relatively folded (as shown in FIG. 1A), the surface 122 of the second body 120 faces the first body 110, and the linkage assembly K1 is substantially submerged under the surface 122 of the second body 120 (besides the other end of the linking rod 132 is still pivoted to the first body 110). Then, when the user applies a force to unfold the first body 110 relative to the second body 120 (as shown in FIG. 2A), the linking rod 132 is driven by the first body 110 and moves to the above of the surface 122, and the linking rod 134 and the sleeve 136 is driven by the linking rod 132 to move to the surface 122 (the status parallel to the surface 122 as shown in FIG. 2A). Next, when the first body 110 is continuously unfolded relative to the second body 120 (as shown in FIG. 3A), at least a portion of the linkage assembly K1 protrudes above the surface 122 because of the driving of the first body 110.

On the other hand, referring to FIG. 1B, FIG. 2B and FIG. 3B, in the embodiment, the linking rod 134 and the sleeve 136 is disposed along the axis L1 to relatively slide. The linking rod 134 includes a linking body 134c, a propping portion 134a and a stopping portion 134b, wherein the linking body 134c has the first end E1 which is pivoted to the linking rod 132, the stopping portion 134b is located at the second end E2, and the propping portion 134a is connected between the linking body 134c and the stopping portion 134b. Correspondingly, the sleeve 136 has at least one interfering section 136a and a sliding section 136b, wherein the stopping portion 134b is slidably coupled to the sliding section 136b, and the outer diameter of the stopping portion 134b is much greater than the inner diameter of the sleeve 136 at the interfering section 136a, thus the condition of the linking rod 134 moving out and leaving the opening 136c of the sleeve 136 can be avoided.

In addition, it has to be noted that, the inner diameter of the sleeve 136 at the interfering section 136a is equal to or less than the outer diameter of the propping portion 134a. Therefore, when the propping portion 134a slides at the interfering portion 136a, a friction force is generated between the propping portion 134a and the inner wall of the sleeve 136 at the interfering section 136a. Thus, the user needs a larger force to rotate the first body 110 relative to the second body 120, and it means that the torque of the hinge module 130 is effectively increased.

More specifically, referring to FIG. 1B and FIG. 2B, the linkage assembly K1 further includes an elastic member 138, for example a spring, connected between the stopping portion 134b of the linking rod 134 and the bottom wall 136d which is in the sleeve 136. When the first body 110 is rotated from the status shown in FIG. 1A to the status shown in FIG. 2A (relatively unfolded in a first angle T1) by the user applying a force as mentioned above, the second end E2 of the linking rod 134 will move toward the bottom wall 136d of the sleeve 136 as shown in FIG. 1B and FIG. 2B, and then deform the elastic member 138, wherein preferably the elastic member 138 is pressed to reach the critical point of deformation as shown in FIG. 2B, namely, the elastic member 138 is in a status of maximum deformation. Accordingly, when the user no longer applies force to the first body 110, the elastic force of the elastic member 138 drives the linking rod 134 to move toward the opening 136c of the sleeve 136 continuously, namely the propping portion 134a of the linking rod 134 is pushed into the interfering section 136a. And due to this motion status, the first body 110 can be unfolded relative to the second body 120 in a second angle T2 via the linkage assembly K1 continuously (as shown in FIG. 3A, wherein the second angle T2 is greater than the first angle T1).

Referring to FIG. 1B, FIG. 2B and FIG. 3B, how the components of linkage assembly K1 and the bodies 110, 120 are corresponded to each other can be understood. Herein a horizontal axis L2 is taken as a reference and parallel to the surface 122 of the second body 120. As shown in FIG. 2B, when the open angle between the first body 110 and the second body 120 is 0 degree (i.e., the close status as shown in FIG. 1A), the linkage assembly K1 is submerged under the surface 122, thus an included angle A1 exists between the axis L1 of the linkage assembly K1 and the horizontal axis L2. Next, when the first body 110 and the second body 120 are unfolded relatively in the first angle T1, the axis L1 of the linkage assembly K1 is overlapped with the horizontal axis L2, namely the linkage assembly K1 is actually located at the surface 122. Then, through the elastic force of the elastic member 138 driving the linking rod 134 to slide toward the opening 136c of the sleeve 136, the linkage assembly K1 can continuously rotate relative to the second body 120, so that an included angle A2 exists between the axis L1 and the horizontal axis L2.

As such, the user only needs to apply force to the first body 110 to let the first body 110 from being the status of FIG. 1A to the unfolded status of FIG. 2A, then the first body 110 is unfolded to be in the status of FIG. 3A through the driving of the linkage assembly K1 and without applying any force, thus the effect that the electronic device 100 is easily unfolded can be achieved. On the other hand, when the first body 110 is folded (closed) to the second body 120, when the first body 110 is folded in the first angle T1, since the elastic member 138 is pressed because the linking rod 134 moves to the right (as shown in FIG. 2B), a sufficient damping effect is provided. Accordingly, since the first body 110 is gradually folded to the second body 120 to an extent of being completely folded due to the dead weight of the first body 110 and it is no need to worry that the first body 100 might impact the second body 120 through the heavy fall of the first body, the electronic device 100 can be sturdily and firmly folded (closed).

In addition, as shown in FIG. 3A and FIG. 3B, at this time since the propping portion 134a of the linking rod 134 has been moved into the interfering section 136a of the sleeve 136, the hinge module 130 is sufficient to support the second body 120 due to the friction force generated between the linking rod 134 and the sleeve 136. Namely, the friction force increased at this time can be considered that it has an effect of increasing the torque of the hinge module 130. Accordingly, when the user unfolds the first body 110 to a viewable angle (larger than the second angle T2) until before the stopping portion 134b of the linking rod 134 is propped against and interfered in the interfering section 136a of the sleeve 136, the first body 110 can be supported by the friction force generated by the propping portion 134a and the interfering section 136a.

Figure 4:
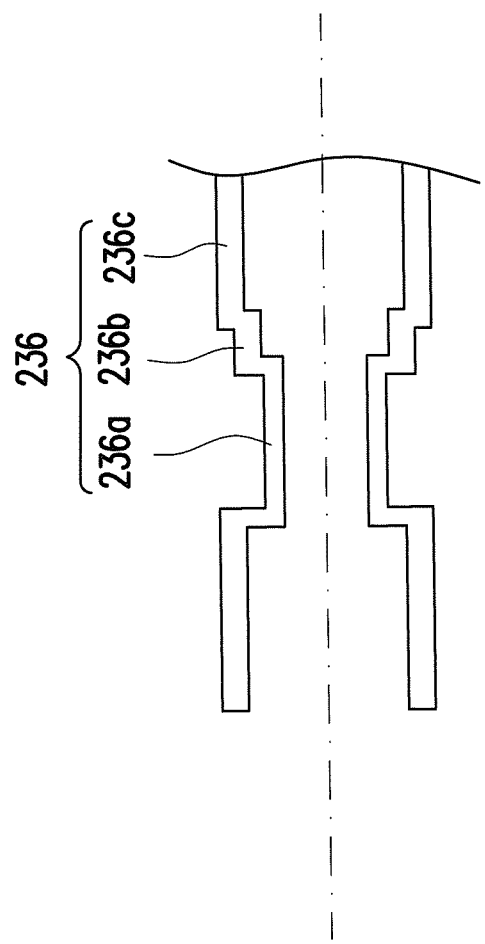
FIG. 4 is a partial schematic view illustrating a sleeve according to another exemplary embodiment of the disclosure.

FIG. 4 is a partial schematic view illustrating a sleeve according to another exemplary embodiment of the disclosure. Referring to FIG. 4 and the same or similar components of the abovementioned embodiment and drawings, the structural features of the part of the sleeve which is nearby the opening are merely described herein. The difference between the present embodiment and the abovementioned embodiment is: the inner wall of the sleeve 236 is partitioned into a plurality of interfering sections 236a, 236b and a sliding section 236c, wherein the inner diameter of the sleeve 236 at the interfering section 236b is larger than the inner diameter of the sleeve 236 at the interfering section 236a. In other words, when the propping portion 134a of the linking rod 134 (please refer to the abovementioned embodiment) is moved into the interfering sections 236a, 236b from the sliding portion 236c, the linking rod 134 and the interfering sections 236a, 236b generate different friction forces therebetween, and accordingly the unfolded first body 110 has different supported forces under the conditions of being in different viewing angles. As such, the electronic device 100 is provided with a hinge module having a multi-stage torque as required. On the other hand, through changing the dimension of the propping portion 134a along the axis L1, the extent of the interfering range between the propping portion 134a and the interfering sections 236a, 236b can determine the included angle and the corresponding torque between the first body 110 and the second body 120.

In light of the foregoing, in the embodiment of the disclosure, the linking rod and the sleeve are formed as the linkage assembly which is a transmitting mechanism between the first body and the second body. The linkage assembly can be driven simultaneously with the relatively rotating of the first body and the second body. At the same time, through the interfering section disposed in the sleeve, when the linking rod moves into the interfering section, a friction force can be generated therebetween. Accordingly, a torque of the hinge module is formed so as to support the first body to be unfolded relative to the second body in a specific angle, simultaneously the friction force is sufficient to support the required supporting force when the user touches the touch screen (namely, the first body). Additionally, through the cooperating of the interference between the propping portion and the interfering section, the open angle between the first body and the second body and the corresponding friction angle can be adjusted. And the required different friction forces corresponding to different open angles can be further designed. Furthermore, through the elastic member propped between the linking rod and the sleeve, the elastic member is compressed or tensioned along with the sliding of the linking rod, thus an operating effect that the bodies can be easily unfolded and sturdily and firmly folded can be achieved. Therefore, through the torque provided by the hinge module, the electronic device can meet the operating requirements of easily open, sturdily closed and unfolded in any open angle.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A hinge module, connected between a first body and a second body of an electronic device, the first body and the second body relatively rotating via the hinge module to be folded or unfolded with each other, and a surface of the second body facing the first body in a folded state, the hinge module comprising:

a hinge connecting the first body and the second body;

a linkage assembly having a first linking rod and a second linking rod, wherein the first linking rod has a first end and a second end, the first end is connected to the second linking rod, and the second linking rod is connected to the first body with an end opposite to the first linking rod;

a sleeve pivoted to the second body, the second end of the first linking rod slidably coupled into the sleeve, and the first linking rod and the sleeve being inclined to and submerged under the surface of the second body in the folded state; and an elastic member connected between the sleeve and the first linking rod, wherein the first linking rod and the sleeve are driven by the first body, such that the first linking rod and the sleeve move to and are horizontal to the surface of the second body when the electronic device is transformed from the folded state to a first unfolded state, and the elastic member is deformed by the sliding motion of the first linking rod relative to the sleeve, wherein the first linking rod and the sleeve are driven by the first body, such that the first linking rod and the sleeve protrude to and are inclined to the surface of the second body when the electronic device is transformed from the first unfolded state to a second unfolded state by a restoring force of the deformed elastic member, wherein a first angle is included between the first body and the second body when the electronic device is in the first unfolded state, a second angle is included between the first body and the second body when the electronic device is in the second unfolded state, and the second angle is greater than the first angle, wherein an inner wall of the sleeve has at least one interfering section, and the first body drives the first linking rod to move and interfere with the interfering section when the electronic device is in the second unfolded state, such that the first body is supported by the hinge module, wherein the inner wall of the sleeve has a sliding section located between a bottom wall and the interfering section, an inner diameter of the sleeve located at the sliding section is greater than an inner diameter of the sleeve located at the interfering section, and the first linking rod has a stopping portion located at the second end wherein the stopping portion is slidably coupled to the sliding section, wherein an outer diameter of the stopping portion is greater than the inner diameter of the sleeve located at the interfering section so as to restrict the stopping portion to slide in the sliding section.

2. The hinge module as claimed in claim 1, wherein the first linking rod further has a propping portion located between the stopping portion and the first end, and when the propping portion slides in the interfering section, a friction force is generated therebetween.

3. The hinge module as claimed in claim 2, wherein the inner wall of the sleeve has a plurality of interfering sections, and when the propping portion slides in the interfering sections, different friction forces are generated therebetween.

4. The hinge module as claimed in claim 2, wherein the propping portion and the stopping portion are located at the sliding section in the folded state.

5. The hinge module as claimed in claim 4, wherein when the electronic device is in the first unfolded state, the second end of the first linking rod moves toward the bottom wall of the sleeve and deforms the elastic member, then an elastic force of the elastic member drives the second end to be far away from the bottom wall of the sleeve, and when the electronic device is in the second unfolded state, the propping portion enters the interfering section and supports the first body to be folded relative to the second body to the second angle.

6. An electronic device, comprising:
a first body;
a second body;
a hinge module, comprising:
a hinge connecting the first body and the second body, wherein the first body and the second body relatively rotate via the hinge module to be folded or unfolded with each other, and a surface of the second faces the first body in a folded state;
a linkage assembly having a first linking rod and a second linking rod,
wherein the first linking rod has first end and a second end, the first end is connected to the second linking rod, and the second linking rod is connected to the first body with an end opposite to the first linking rod;
a sleeve pivoted to the second body, the second end of the first linking rod slidably coupled into the sleeve, and the first linking rod and the sleeve being inclined to and submerged under the surface of the second body in the folded state; and
an elastic member connected between the sleeve and the first linking rod wherein the first linking rod and the sleeve are driven by the first body, such that the first linking rod and the sleeve move to and are horizontal to the surface of the second body when the electronic device is transformed from the folded state to a first unfolded state, and the elastic member is deformed by the sliding motion of the first linking rod relative to the sleeve, wherein the first linking rod and the sleeve are driven by the first body, such that the first linking rod and the sleeve protrude to and are inclined to the surface of the second body when the electronic device is transformed from the first unfolded state to a second unfolded state by a restoring force of the deformed elastic member, wherein a first angle is included between the first body and the second body when the electronic device is in the first unfolded state, a second angle is included between the first body and the second body when the electronic device is in the second unfolded state, and the second angle is greater than the first angle, wherein an inner wall of the sleeve has at least one interfering section, and the first body drives the first linking rod to move and interfere with the interfering section when the electronic device is in the second unfolded state, such that the first body is supported by the hinge module, wherein the inner wall of the sleeve has a sliding section located between a bottom wall and the interfering section, an inner diameter of the sleeve located at the sliding section is greater than an inner diameter of the sleeve located at the interfering section, and the first linking rod has a stopping portion located at the second end wherein the stopping portion is slidably coupled to the sliding section, wherein an outer diameter of the stopping portion is greater than the inner diameter of the sleeve located at the interfering section so as to restrict the stopping portion to slide in the sliding section.

7. The electronic device as claimed in claim 6, wherein the inner wall of the sleeve further has a sliding section located between a bottom wall and the interfering section, an inner diameter of the sleeve located at the sliding section is greater than an inner diameter of the sleeve located at the interfering section, and the first linking rod has a stopping portion located at the second end wherein the stopping portion is slidably coupled to the sliding section.

8. The electronic device as claimed in claim 7, wherein an outer diameter of the stopping portion is greater than the inner diameter of the sleeve located at the interfering section so as to restrict the stopping portion to slide in the sliding section.

9. The electronic device as claimed in claim 7, wherein the first linking rod further has a propping portion located between the stopping portion and the first end, and when the propping portion slides in the interfering section, a friction force is generated therebetween.

10. The electronic device as claimed in claim 9, wherein the inner wall of the sleeve has a plurality of interfering sections, and when the propping portion slides in the interfering sections, different friction forces are generated therebetween.

11. The electronic device as claimed in claim 9, wherein the propping portion and the stopping portion are located at the sliding section in the folded state.

12. The electronic device as claimed in claim 11, wherein when the electronic device is in the first unfolded state, the second end of the first linking rod moves toward the bottom wall of the sleeve and deforms the elastic member, then an elastic force of the elastic member drives the second end to be far away from the bottom wall of the sleeve, and when the electronic device is in the second unfolded state, the propping portion enters the interfering section and supports the first body to be folded relative to the second body to the second angle.

* * * * *